United States Patent [19]

Dosaka

[11] Patent Number: 5,128,808
[45] Date of Patent: Jul. 7, 1992

[54] TURRET CONDENSER FOR MICROSCOPES
[75] Inventor: Shinichi Dosaka, Tsukui, Japan
[73] Assignee: Olympus Optical Co., Ltd., Tokyo, Japan
[21] Appl. No.: 613,009
[22] Filed: Nov. 15, 1990
[30] Foreign Application Priority Data Nov. 15, 1989 [JP] Japan .................. 1-297177

[51] Int. Cl.⁵ .............................................. G02B 7/02
[52] U.S. Cl. ................................. 359/821; 359/811;
359/817; 359/381; 359/233
[58] Field of Search ............... 359/811, 810, 805, 817,
359/821, 368, 754, 483, 889, 233, 234, 235, 381,
370, 369, 236; 250/234; 378/43

[56] References Cited
U.S. PATENT DOCUMENTS

| 3,333,505 | 8/1967 | Unuma ................... 359/889 |
| 3,930,712 | 1/1976 | Boughton et al. |
| 4,136,927 | 1/1979 | Lisfeld . |
| 4,368,947 | 1/1983 | Yoshinaga et al. ............. 359/381 |
| 4,521,076 | 6/1985 | Weber et al. ................... 359/821 |
| 4,544,236 | 10/1985 | Endo ................... 359/821 |
| 4,844,568 | 7/1989 | Suzuki et al. ................ 359/210 |
| 4,953,188 | 8/1990 | Siegel et al. ................ 378/43 |

FOREIGN PATENT DOCUMENTS 49-84262  8/1974  Japan .
61-34126  8/1986  Japan .

Primary Examiner—Loha Ben
Attorney, Agent, or Firm—Cushman, Darby & Cushman

[57] ABSTRACT

A turret condenser for microscopes is equipped with two turrets which are capable of interposing combinations of numerous types of optical elements on the optical axis and rotatably arranged in overlapped positions in the vicinity of the pupil of a condenser lens. Most of the optical elements are removably accommodated in each of the turrets. This turret condenser makes it possible to perform microscopy in various modes by simple operations.

6 Claims, 4 Drawing Sheets

TURRET CONDENSER FOR MICROSCOPES

BACKGROUND OF THE INVENTION a) Field of the invention

The present invention relates to a microscope and more specifically a turret condenser for microscopes.

b) Description of the prior art

A condenser for microscopes must generally be designed so as to meet requirements: 1) to be compatible with various objective lenses having magnifications different from one another and 2) to be useable for microscopy in various modes using a phase plate, a dark field plate, a Nomarski prism and a polarizing plate.

In order to meet the above-mentioned requirement 1), it is necessary to adopt a mechanism capable of varying size of illumination field and numerical aperture in conjunction with objective lenses to be used for microscopy as exemplified in the condenser for microscopes disclosed by Japanese Patent Preliminary Publication No. Sho 61-34126. This condenser comprises a fixed lens and two movable lenses, and is so adapted as to be compatible with objective lenses having a broad range of magnifications by using the lenses in various combinations. The condenser for microscopes is composed, needless to say, so as to exchangeably accommodate optical elements such as a Nomarski prism, a phase plate and a dark field plate. Further, there are known, as condensers for microscopes which meet the requirement 1) and are disclosed by, for example, Japanese Patent Preliminary Publication No. Sho 49-84262, double-stage turret type condensers which comprise completed condenser lenses for high and low magnifications in a first-stage turret, and various types of optical elements such as those mentioned above in a second-stage turret.

In order to meet the requirement 2) described above, it is necessary to adopt a mechanism which permits interposing optical elements in conjunction with modes of microscopy at a location in the vicinity of the pupil of a condenser lens, and a condenser having such a mechanism is developed as a commercial product available as a universal condenser. FIG. 1 shows a single-stage type turret condenser having the general or conventional construction which permits interposing a phase plate, a dark field plate, a Nomarski prism and a stop selectively at the location of the pupil of a fixed condenser lens. In this drawing, the reference numeral 1 represents a condenser body having a mounting portion 1a, the reference numeral 2 designates a condenser lens fixed to the condenser body 1, the reference numeral 3 denotes a turret which is pivoted to the condenser body 1, and capable of selectively interposing optical elements 4 such as a phase plate, a dark field plate, a Nomarski prism and a stop which are fixed or exchangeably accommodated therein at the location of the pupil on the optical axis of the condenser lens 2, and the reference numeral 5 represents a slider which is slidably fitted in the condenser body 1 and capable of interposing an empty hole and a rotatably fitted polarizer 5a selectively on the optical axis of the condenser lens 2. The empty hole of the slider 5 is interposed in the optical path when the optical element 4 is selected so as to be suited for bright field microscopy, dark field microscopy or phase difference misroscopy by adequately operating the turret 3 and the slider 5, whereas the polarizer 5a is inserted into the optical path when the optical element 4 is selected so as to be suited for polarizing microscopy or differential interference microscopy.

The condenser for microscopes disclosed in Japanese Patent Preliminary Publication No. Sho 61-34126 has a single-stage turret, and therefore poses problems that certain accommodating holes contain no stops when Nomarski prisms are set in all of the accommodating holes for optical elements, and that a single condenser is insufficient for microscopy requiring two optical elements such as the differential interference microscopy by using a Nomarski prism and a polarizer, the polarizing microscopy by using a polarizer and a green filter, and the transmission fluorescence microscopy by using an exciting filter and a dark field plate. Further, the condenser disclosed in Japanese Patent Preliminary Publication No. Sho 49-84262 mentioned above which accommodates completed condenser lenses poses problems that the condenser requires a rather large number of lenses, and that the condenser is not only large and expensive but also it cannot accommodate numerous types of optical elements. Further, this condenser requires a large space to be reserved between the mounting portion and the condenser lens, thereby posing further problems that it constitutes a hindrance to compact design of a microscope as a whole and that it does not permit using a combination of two optical elements as described above. Furthermore, the condenser illustrated in FIG. 1 is usable for microscopy in the general modes, but the turret 3 has a limited number of accommodating holes for optical elements, thereby limiting modes of microscopy to be performed with the condenser.

SUMMARY OF THE INVENTION

A primary object of the present invention is to provide a turret condenser for microscopes which is equipped with two turrets overlapped with each other in the vicinity of the pupil of a condenser lens and is capable of interposing combinations of numerous types of optical elements on the optical axis of the condenser lens.

Another object of the present invention is to provide a turret condenser for microscopes which is so adapted as to removably accommodate most of the optical elements in each of the turret and permit microscopy in a larger number of modes.

In order to attain to the objects described above, the turret condenser for microscopes according to the present invention is equipped with a first turret capable of interposing first optical elements selectively at the location of the pupil of a condenser lens and a second turret capable of selectively interposing, at a location on the optical axis before or after the first turret, second optical elements to be used for microscopy in combination with the first optical elements for microscopy.

The turret condenser may be further equipped with a slider which has an empty hole and a polarizer, and is capable of inserting these optical elements selectively on the optical axis.

Further, when a swingout condenser lens system is to be used, the first turret is so adapted as to be capable of selectively interposing the first optical element at the location of the pupil of the swingout condenser lens system between a front lens and a fixed lens of the swingout condenser lens system.

Furthermore, a polarizer is fixed to a ring gear which is rotatably accommodated in the second turret, has teeth on the circumference thereof and is rotated by a driving gear having teeth in the same number as that of the teeth of the ring gear and partially extruding from the outer circumference of the turret. The polarizer is adapted in such a manner that it can be locked lightly at a standard position and another position rotated 90° from the standard position by a click means.

Since it is possible to use the optical elements in various pairs by rotating the first turret and the second turret respectively, the turret condenser according to the present invention permits microscopy in various modes by using numerous types of objective lenses having different magnifications and effects.

Moreover, since the polarizer is lightly locked at the predetermined position by the click means when the polarizer is inserted on the optical axis by operating the second turret, it is easy to align the polarizer with the optical axis.

The turret condenser according to the present invention makes it possible to perform microscopy in various modes by simple operations and eliminates the necessity to prepare different types of condensers for microscopy in different modes, thereby providing high convenience for practice. In addition, when a swingout condenser lens system is adopted in combination with the turret condenser, the effect of the turret condenser for microscopes according to the present invention is further enhanced so as to make it possible to perform microscopy in various modes in a broad range of magnifications of objective lens systems.

These and other objects as well as the features and the advantages of the present invention will become apparent from the following detailed description of the preferred embodiments when taken in conjunction with the accompanying drawings.

DESCRIPTION OF THE PREFERRED EMBODIMENTS

Figure 1:
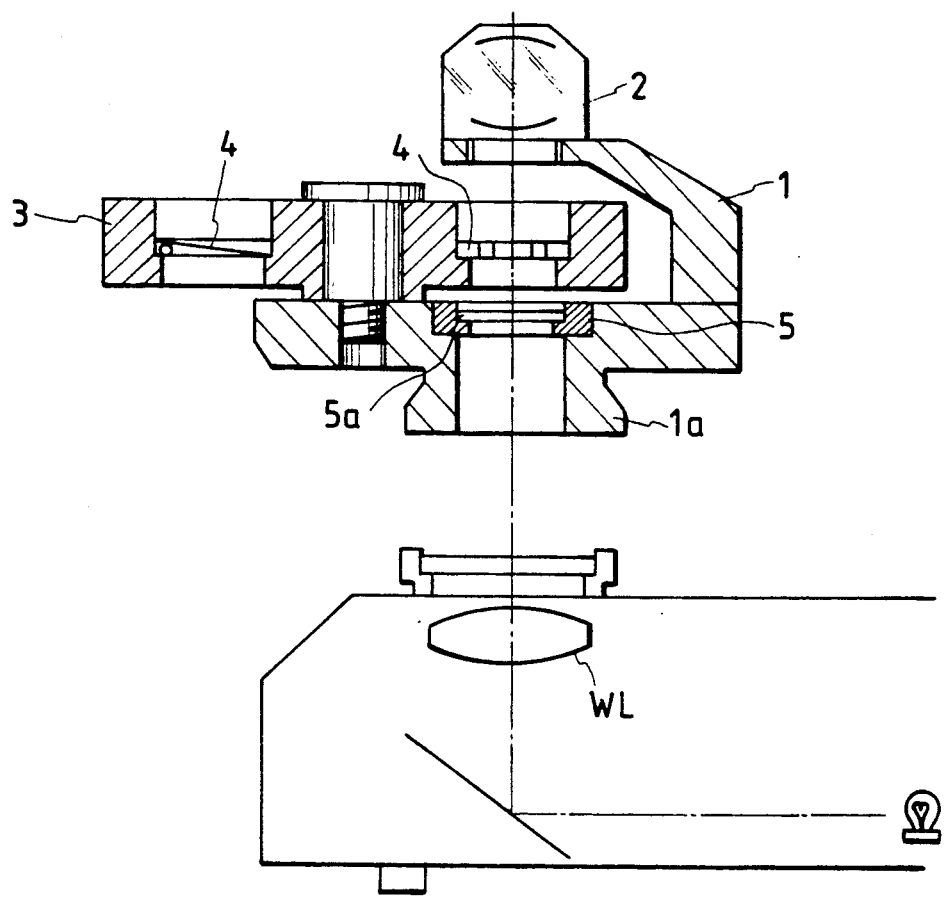
FIG. 1 is a longitudinal sectional view exemplifying the conventional turret condenser for microscopes.

Now, the present invention will be described in more detail with reference to the preferred embodiments illustrated in the accompanying drawings by using the same reference numerals for representing the parts and members which are substantially the same as those described with reference to the prior art.

Figure 2:
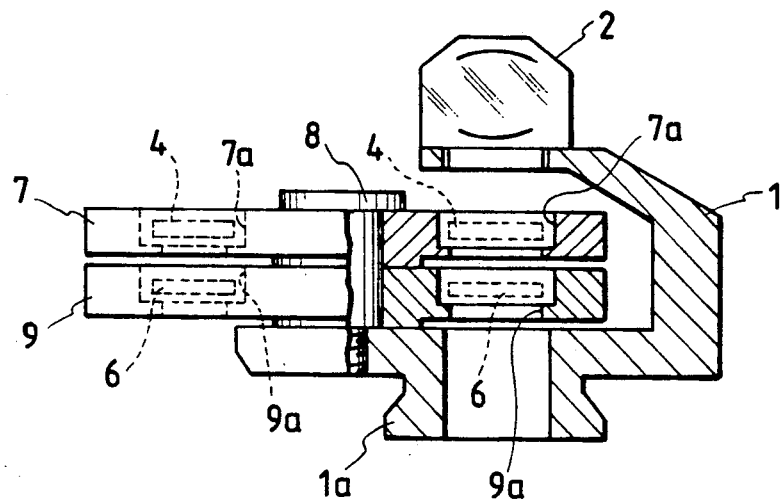
FIG. 2 is a partially broken side view Illustrating a first Embodiment of the turret condenser for microscopes according to the present invention.

FIG. 2 shows the first Embodiment of the present invention. In this drawing, the reference numeral 7 represents a first turret which is pivoted on a shaft 8 threaddedly fixed on the condenser body 1 and has a plurality of holes 7a accommodating optical elements 4 to be interposed at the location of the pupil of a condenser lens 2 in alignment with the optical axis thereof, and the reference numeral 9 designates a second turret which is pivoted on the shaft 8 at a location adjacent to the first turret 7 and has a plurality of holes 9a accommodating optical elements 6 to be interposed on the optical axis in combination with any one of the optical elements 4 required for microscopy.

Since the first Embodiment is composed as described above, it permits obtaining a combination of the two optical elements 4 and 6 required for microscopy in a desired mode very easily and quickly by adequately rotating the first turret 7 and the second turret 9. That is to say, the first Embodiment makes it possible to perform, with single condenser, microscopy in various modes in a broad range of magnifications by using objective lenses having magnifications or effects different from one another. For example, the first Embodiment makes it possible to perform, by using objective lenses having different magnifications, bright field microscopy with a combination of an empty hole and a stop, dark field microscopy with a dark field plate and an empty hole, dark field fluorescence microscopy with a combination of a dark field plate and an exciting filter, phase difference microscopy with a combination of a phase plate and an empty hole, differential interference microscopy with a combination of a Nomarski prism and a polarizer, and polarizing microscopy with a combination of a polarizer and a green filter. In the first Embodiment, an optical element such as the Nomarski prism, which has a relation to the location of the pupil of the Nomarski prism but may not necessarily be interposed at the location of the pupil, may be designed so as to be accommodated in the second turret, and a stop may also be accommodated in the second turret within a range allowable from the optical viewpoint.

Figure 3:
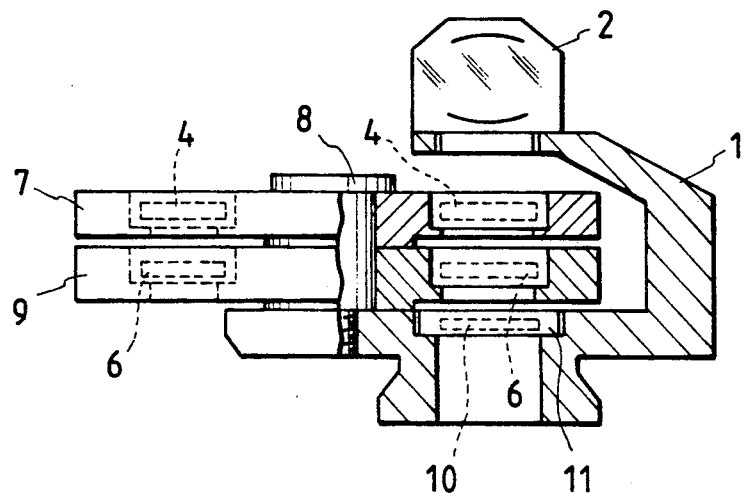
FIG. 3 is a partially broken side view illustrating a second Embodiment of the turret condenser for microscope according to the present invention.
Figure 4:
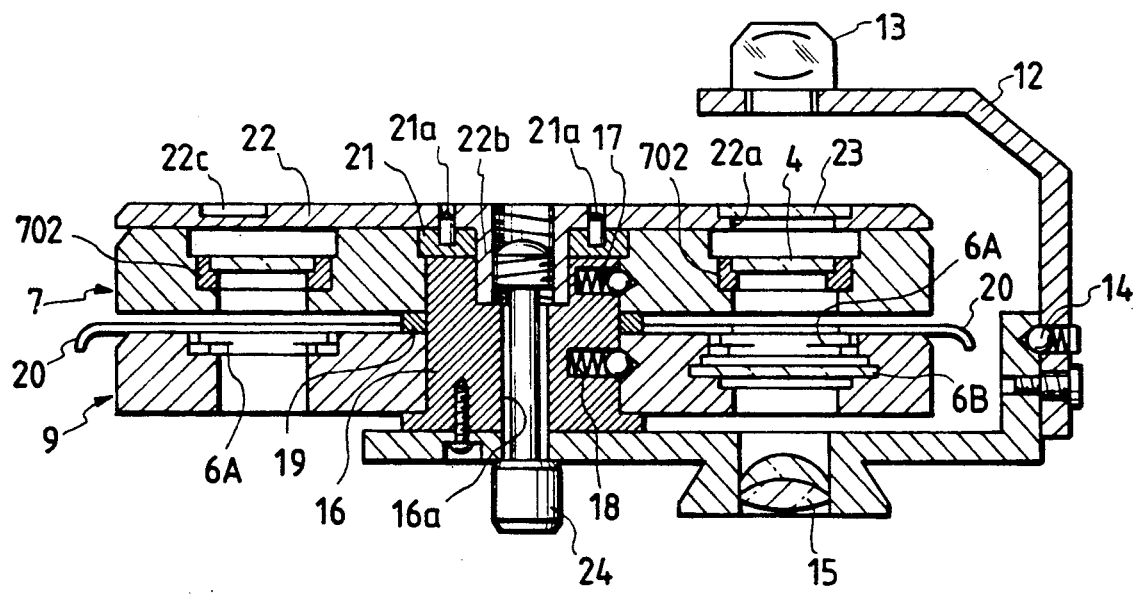
FIG. 4 is a longitudinal sectional view illustrating a third Embodiment of the turret condenser for microscopes according to the present invention.

FIG. 3 illustrates the second Embodiment of the present invention. Different from the first Embodiment and second Embodiment is designed in such a manner that the optical elements 4, for example, the phase plate, dark field plate and stop are removably accommodated in the holes 7a of the first turret, that the optical elements 6, for example, the Nomarski prisms for use in combination with objective lenses, having different magnifications are designed so as to be positioned at the location of the pupil of the condenser lens and removably accommodated in the holes 9a of the second turret, and that the condenser body 1 is equipped, at a location adjacent to the second turret 9, with a slider 11 which has a polarizer 10 and an empty hole, and is slidably fitted into the condenser body 1 so as to be capable of selectively setting the polarizer and the empty hole on the optical axis.

When five holes are arranged in each of the first turret 7 and the second turret 9, the second Embodiment having the above-described composition permits the bright field microscopy (stop aperture adjustable), the differential interference microscopy (stop aperture adjustable) and the dark field microscopy, for example, with each of four types of objective lenses (4×,10×,40× and 100×) simply by turret rotating operations without exchanging the optical elements 4, 6 and 10. It provides advantages to permit performing microscopy in numerous modes and utilizing an empty hole as a stop as described above. In addition, the first Embodiment is usable for the differential interference microscopy when a polarizer is arranged on the window lens WL shown in FIG. 1.

Though the second Embodiment has been described above on assumptions that the first turret accommodates the phase plate and dark field plate and that the second turret accommodates Nomarski prisms, the second Embodiment is usable for the bright field microscopy with adjustable stop aperture by using each of the objective lenses with magnifications of 4× through 100×, the differential interference microscopy by using two types of objective lenses and the phase difference microscopy by using two types of objective lenses when the first turret has holes removably accommodating at least a phase plate, a dark field plate and a Nomarski prism, and the second turret has at least a hole accommodating an adjustable stop and another hole accommodating a polarizer and an adjustable stop. In this case, the polarizer accommodated in the second turret eliminates the inconvenience and structural complexity which are produced by using the polarizer in the first Embodiment.

Figure 5:
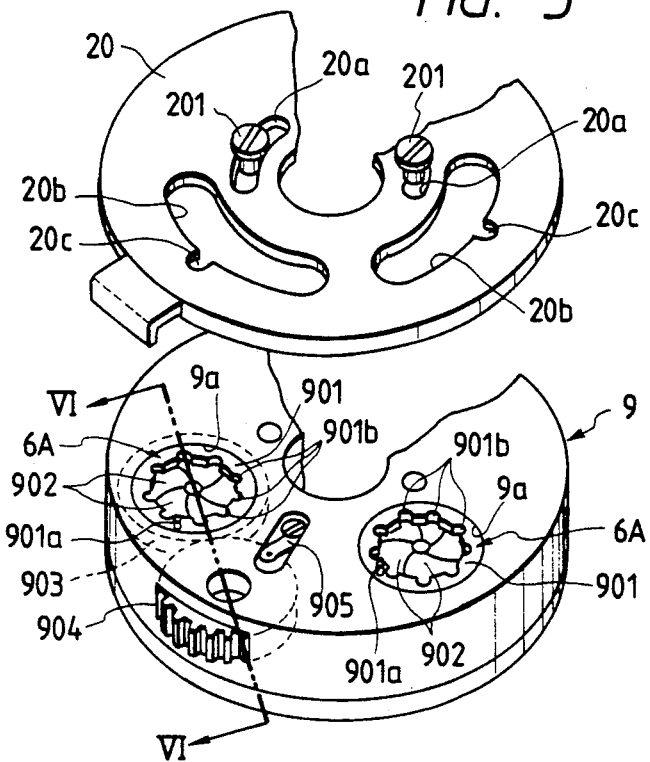
FIG. 5 is a perspective view illustrating the main parts in disassembled conditions for clarifying minute structures of a stop operating board and the second turret used in the third Embodiment.
Figure 6:
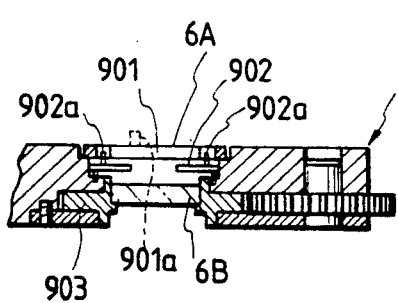
FIG. 6 is a sectional view taken along the VI—VI line in FIG. 5.

FIG. 4 through FIG. 11 illustrate the third Embodiment of the present invention. In these drawings, the reference numeral 12 represents an arm which is pivoted to the condenser body 1, supports a front lens 13 of a swingout condenser lens, and is capable of setting the front lens 13 at a used position (shown in FIG. 4) and an unused position with a click means 14, the reference numeral 15 designates a fixed lens of the swingout condenser lens which is fixed to the condenser body 1 so as to be in alignment with the front lens 13 set in the used position thereof, the reference numeral 16 denotes a shaft which is fixed to the condenser body 1, has a stepped through hole 16a, and pivots the first turret 7 and the second turret 9 so as to be locked at a plurality of predetermined locations by click means 17 and 18 respectively, the reference numeral 19 represents a spacer which is interposed between the first turret 7 and the second turret 9, the reference numeral 20 designates a stop operating board for opening and closing a stop 6A which is accommodated as described later as the optical element 6 in the second turret, the reference numeral 21 denotes a turret stopper which is fixed to the top surface of the shaft 16, and has a hole having the same diameter as that of the larger-diameter portion of the stepped through hole 16a and a pair of positioning pins 21a, 21a, the reference numeral 22 represents a cover which is fitted over the positioning pins 21a, 21a, and has a hole 22a in alignment with the optical axis of the front lens 13 set at the used position thereof, a tapped cylindrical shaft 22b fitted commonly into the larger-diameter portion of the stepped through hole 16a of the shaft 16 and the hole of the turret stopper 21, and a cavity 22c for accommodating indicator assembly to be described later, the reference numeral 23 designates a parallel glass plate fitted into the hole 22a of the cover 22, and the reference numeral 24 denotes a cover removing knob which is fitted through the stepped hole 16a, and has a tip portion screwed into the tapped hole of the cylindrical shaft portion 22b and a root portion protruding from the condenser body 1. In addition, the reference numeral 6B represents a polarizer which is accommodated in the second turret 9 together with the stop 6A. FIG. 5 and FIG. 6 show details of the structure to attach the stop 6A and the polarizer 6B in the hole 9a of the second turret 9 (the structure shown in the right side of FIG. 4). In these drawings, the reference numeral 901 represents a stop driving ring which is rotatably fitted in the hole 9a, and has a pin 901a and a plurality of slots 901b extending in the radial directions, the reference numeral 902 designates a plurality of stop blades of the known shape each of which is pivoted to the second turret 9 and has a pin 902a to be fitted into the slot 901b, the reference numeral 903 denotes a ring gear which supports the polarizer 6B and is rotatably attached to the second turret 9, the reference numeral 904 represents a polarizer driving gear which is rotatably attached to the second turret 9 in such a manner that a portion of the gear protrudes from the circumference of the second turret 9, engaged with the ring gear 903 and has teeth in the same number as that of the teeth of the ring gear 903, and the reference numeral 905 designates a click means which is arranged on the second turret 9 for temporarily locking the polarizer driving gear 904 at a predetermined standard location and another location rotated 90° from the standard location. In addition, formed in the stop operating board 20 are a pair of arc-shaped slots 20a which enable to rotate the stop operating board 20 for a predetermined angular range relative to the second turret 9, a pair of arc-shaped openings 20b which extend over the predetermined angular range and have sizes corresponding to those of the holes 9a, and a pair of slots 20c which are communicated with the arc-shaped openings 20b, extend in the radial directions and to be engaged with the pins 901a of the stop driving rings 901. The stop operating board 20 is rotatably mounted on the second turret 9 with screws 201 which are passing through the arc-shaped slots 20a and serve also as stoppers.

Figure 7:
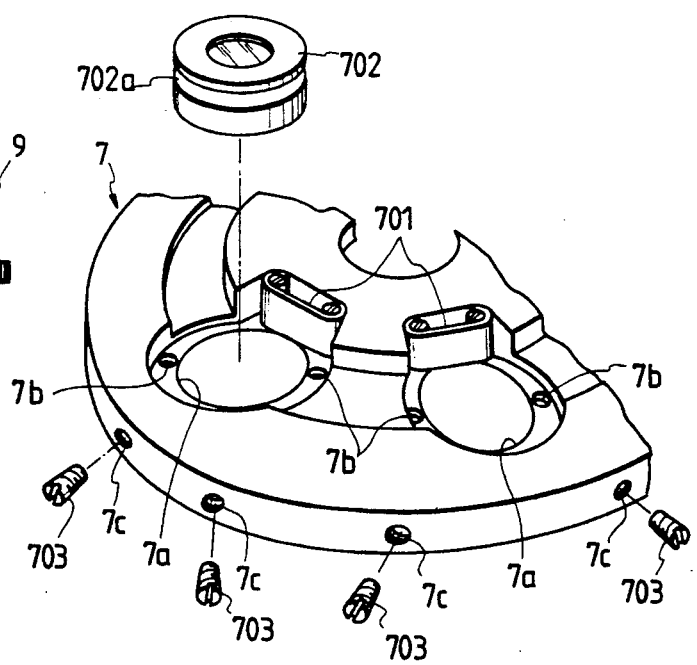
FIG. 7 is a perspective view illustrating the main parts in disassembled conditions for clarifying minute structures of the first turret used in the third Embodiment.
Figure 8A:
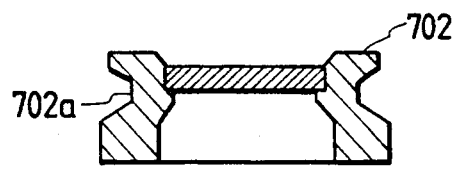
FIG. 8A and FIG. 8B are longitudinal sectional views illustrating optical element holders which are different from each other.
Figure 8B:
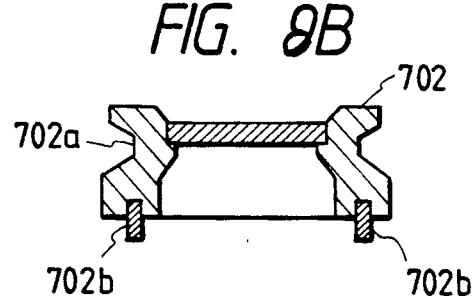
Figure 10:
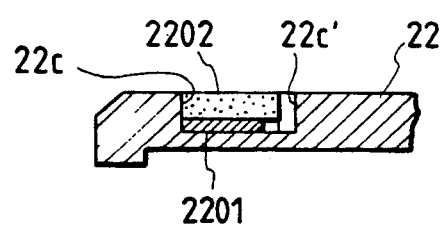
FIG. 10 is a sectional view taken along the X—X line in FIG. 9.
Figure 9:
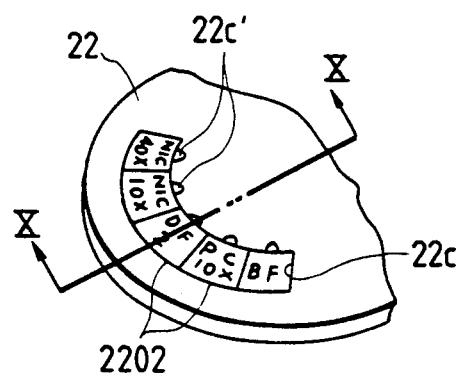
FIG. 9 is a perspective view illustrating optical element indicators arranged on a cover.
Figure 11:
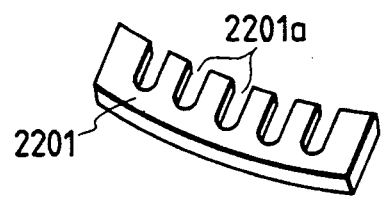
FIG. 11 is a perspective view illustrating the iron plate shown in FIG. 10.

FIG. 7 and FIG. 8 illustrate details of the structure for accommodating the optical elements 4 (phase plate, dark field plate, Nomarski prism, etc.) into the holes 7a of the first turret 7. A pair of positioning holes 7b, 7b and a leaf spring 701 which extends in the direction tangential on the circumferential edge of the hole 7a are arranged around each of the holes 7a. Further, formed in the outer circumferential surface of the first turret 7 are tapped holes 7c, 7c for accommodating a pair of screws 703,703 whose tips are to be brought into contact with an outer circumferential surface of an optical element holder 702 for centering the holder 702 when it is set in the hole 7a. In addition, formed in the outer circumferential surface of the holder 702 is a ring-shaped groove 702a which is to be engaged with a portion of the leaf spring 701 when the holder 702 is set into the hole 7a. In particular in case of the holder for holding a Nomarski prism as the optical elements 4, planted on the bottom of the holder 702 are a pair of pins 702b, 702b which are to be fitted into the pair of positioning holes 7b, 7b formed in the first turret 7 as shown in FIG. 8B. FIG. 9 through FIG. 11 show details of the structure of the indicator assembly to be accommodated into the cavity 22c of the cover 22. In these drawings, the reference numeral 2201 represents an arc-shaped iron plate which is bonded to the bottom surface of the arc-shaped cavity 22c having notch portions 22c', arranged at equal intervals and have notch portions 2201a to be aligned with the notch portions 22c' and the reference numeral 2202 designates indicator pieces which are made of rubber magnet, equipped with markings to indicate types of the optical elements accommodates in the first and second turrets, and have sizes to be fitted into the cavity 22c. Each of the indicator pieces 2202 can easily be removed from the iron plate 2201 by lifting it up with a pointed end of a ball-tip pen or the similar means inserted into the notch portion 22c'.

For setting the optical elements 4 into the first turret 7 prior to microscopy with the third Embodiment having the composition described above, the cover is detached by turning the knob 24 and the optical elements are to be exchanged as required. For exchanging an optical element with another the optical element holder 702 is lifted up while being pinched between fingers, and the leaf spring 701 is flexed outward by the slanted side surface of the ring-shaped groove 702a, whereby the holder 702 can easily be removed out of the hole 7a. Then, the holder 702 accommodating the required optical element is to be set into the hole 7a. At this stage, the holder 702 shown in FIG. 8A is to be used for setting the phase plate or the dark field plate, whereas the holder 702 shown in FIG. 8B is to be selected for setting the Nomarski prism. The holder 702 shown in FIG. 8B is set into the hole 7a by fitting the pair of pins 702b, 702b into the positioning holes 7b, 7b respectively formed in the first turret 7. In any case where the holder 702 shown in FIG. 8A or FIG. 8B is used, however, the optical element can be easily set in position since the leaf spring 701 is once flexed outward and then is fitted into the ring-shaped groove 702a upon fitting of the holder 702 into the hole 7a. In addition, when the phase plate or dark field plate is selected as the optical element 4, the holder is centered by adequately turning the pair of screws 703, 703 after the holder 702 is fitted into the hole 7a as described above. After the exchange of the optical elements 4, the indicator piece 2202 must be exchanged in conjunction with the selection of the optical element 4. The exchange of the indicator piece is performed by removing the indicator piece with the pointed end of a ball-tip pen inserted into the notch portion 22c' and fitting the indicator piece 2202 corresponding to the selected optical element 4 into the cavity 22c. The indicator piece is made of rubber magnet which is attracted by the iron plate 2201 and cannot be detached accidentally. Then, the cover 22 is fitted over the positioning pins 21a, 21a so as to cover the first turret 7 and the knob 24 is turned so as to screw the tip thereof into the cylindrical shaft portion 22b, whereby the cover 22 is fixed and the exchanging operations are completed. In the third Embodiment, the parallel glass plate 23 serves as a protective cover for the optical element 4 and prevents dust from entering the interior of the turret condenser.

After the preparations for microscopy have been made as described above, the turret condenser is operated as follows for performing microscopy. The optical elements 4 and 6 required for microscopy are brought onto the optical axis of the fixed lens 15 by turning the first turret 7 and the second turret 9, and the front lens 13 is set out of the optical path by turning the arm 12 when an objective lens having a low magnification is to be employed for microscopy. At this stage, the first turret 7, the second turret 9 and the arm 12 are locked at the predetermined positions without fail by the click means 17, 18 and 14 respectively. Accordingly, the aperture of the stop is adequately adjustable by turning the stop operating board 20 when the stop 6A is brought onto the optical axis of the condenser lens, or the polarizing direction is determined by turning the driving gear 904 and is maintained by the click means 905 when the polarizer 6B is brought onto the optical axis of the condenser lens.

When an objective lens having a high magnification is selected for microscopy, the front lens 13 is set at the location shown in the drawing and microscopy is performed in various modes by the same operations as those described above.

What is claimed is:

1. A turret condenser for microscopes comprising:
a first turret rotatably mounted in a condenser body, for selectively interposing any one of first optical elements at the location of a pupil of a condenser lens; and
a second turret rotatably mounted in said condenser body at a location adjacent to said first turret, for selectively interposing any one of second optical elements in an optical axis of said condenser lens, on one side of said first turret, to be used for microscopy in combination with said any one of first optical elements,
said first and second turrets being relatively rotated on a fixed shaft,
said shaft being disposed at a location different from the optical axis of said condenser lens.

2. A turret condenser for microscopes according to claim 1, wherein said second turret is arranged on the light source side of said first turret, said first turret has at least one hole for accommodating a phase plate, a hole for accommodating a dark field plate and a hole for accommodating an adjustable stop, and said second turret has at least one hole for accommodating a Nomarski prism constructed to have a localized position coincident with the location of the pupil of said condenser lens and an empty hole.

3. A turret condenser for microscopes according to claim 2, further comprising a slider having an empty hole and a polarizer, and capable of interposing said empty hole and said polarizer selectively in the optical path of said condenser lens.

4. A turret condenser for microscopes according to claim 1, wherein said first turret has at least one hole for accommodating a phase plate, a hole for accommodating a dark field plate, a hole for accommodating a Nomarski prism and an empty hole, and said second turret has at least one hole for accommodating an adjustable stop, and a hole for accommodating a polarizer and an adjustable stop.

5. A turret condenser for microscopes according to claim 4, wherein said polarizer is supported by a ring gear rotatably mounted on said second turret, said ring gear is constructed to be rotatable by a driving gear having teeth in the same number as that of the teeth of said ring gear and rotatably mounted on said second turret in such a manner that a portion of said driving gear extrudes from the outer circumference of said second turret, and click means being provided for temporarily locking said polarizer at a standard position and another position rotated 90° therefrom when said polarizer is rotated by said driving gear.

6. A turret condenser for microscopes comprising:
a first turret rotatably mounted in a condenser body at a location between a front lens and a fixed lens of a swingout condenser lens system, for interposing first optical elements selectively at the location of the pupil of said swingout condenser lens system; and
a second turret rotatably mounted in said condenser body on one side of said first turret, for interposing second optical elements selectively in an optical path to be used for microscopy in combination with said first optical elements;
said first and second turrets being relatively rotated on a fixed shaft.

* * * * *